Nov. 2, 1926.
P. R. GARDNER ET AL
1,605,831
FISHING REEL
Filed April 13, 1926
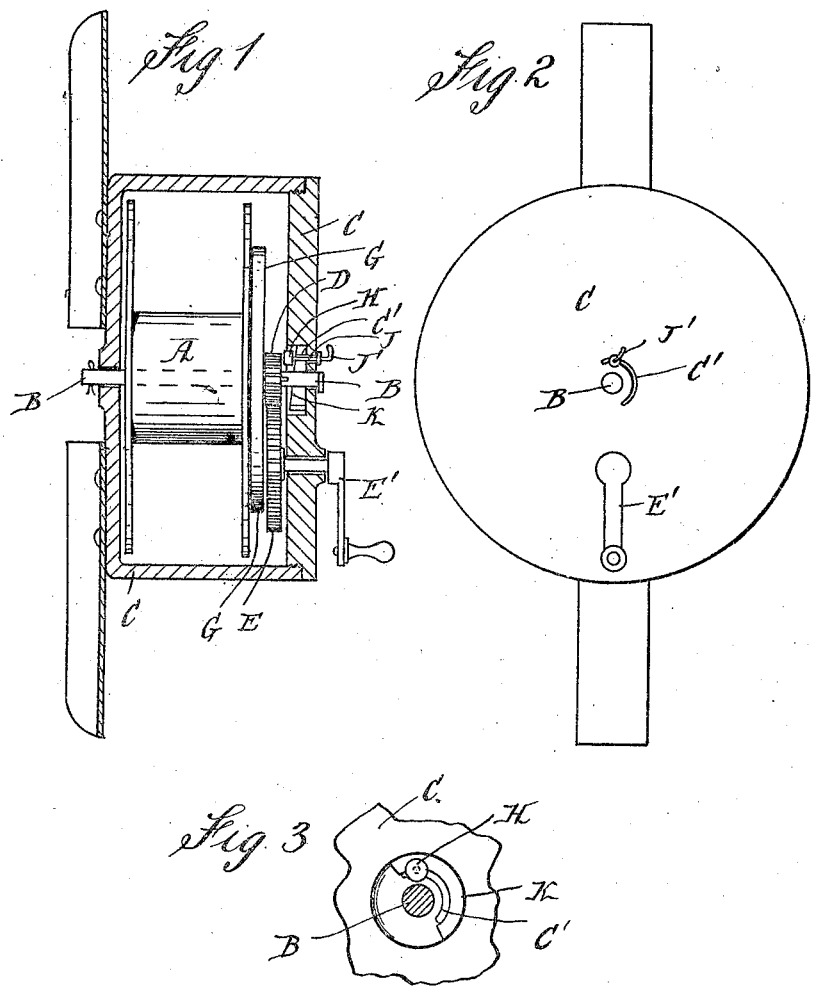

Patented Nov. 2, 1926.

1,605,831

UNITED STATES PATENT OFFICE.

PETER ROBERTSON GARDNER AND DAVID WYLLIE, OF KAMO, NEW ZEALAND.

FISHING REEL.

Application filed April 13, 1926, Serial No. 101,727, and in New Zealand April 27, 1925.

This invention has been devised specially for use with the reels used in deep sea fishing but it is applicable to all fishing reels, to effect the purpose for which it has been designed. This purpose is to provide improved means whereby the reel may be checked in its rotation when the fish is running and such means as will ensure of a nicely adjusted and variable braking control on the reel.

The invention consists in the combination with the reel, and with a driving pinion mounted upon a feather key on such spindle, of a friction disc placed loosely on the spindle between the reel and the said pinion, and means whereby the said pinion may be moved inward along the spindle to force the friction disc into contact with the reel side with a variable degree of pressure. This pressure being made capable of variation in its strength will check the rotation of the reel in the required manner.

The means devised for carrying out the invention are illustrated in the accompanying drawings, in which:—

Figure 1 is an end elevation of the reel, its casing being shown in section.

Figure 2 is a side elevation of the reel.

Figure 3 is a view, on an enlarged scale, of a detail part of the device.

In this invention the reel A is mounted as usual to rotate with its spindle B in the casing or frame C and such spindle is geared by a pinion D mounted thereon, with a gear wheel E journalled in the reel casing or frame C and having a crank handle E' combined therewith. This crank handle is of the well known free wheel type so that it may allow the reel to run freely in one direction but will lock with the gear wheel to rotate the reel in the other direction, or the gear wheel may be itself of the free wheel type.

The said pinion D is mounted on the reel spindle B by a feather key in a well known way to permit of the pinion moving along the spindle. A brake disc G of approved material is interposed between the pinion D and the adjacent side surface of the reel A, such disc being loose on the spindle so that it may move along it and be pressed more or less against the reel side, or be freed therefrom. This pressing action of the brake disc upon the reel and its release therefrom are designed to be produced by the inward and outward movements of the pinion D along the reel spindle.

The means for thus moving the said pinion inward are of such a nature that the amount of movement may be accurately controlled to apply the braking action slowly and evenly and with variable degrees of pressure. They consist in a block H that is fixed upon the inner end of a pin J extending through a slot C' in the reel casing or frame so that the block is positioned on the inside of the frame adjacent to the side of the pinion, and the outer end of the pin is on the outside of such frame. This end is formed with a finger grip or small handle J' thereon. The slot through which the pin passes is curved concentrically with the spindle centre, so that in sliding the pin along the slot, the block on its inner end moves round the spindle. The surface of the reel frame on the inside is formed with an incline K extending in a curve concentric with the spindle and corresponding with the course the said block takes in the movements of the pin. Figure 3 is an inside view of such block and the inclined surface on which it moves.

Consequently by moving the pin J round the slot C' from one end to the other, the block H is caused by its engagement with this incline K to move laterally inward to engage the pinion D and force it inward to press the brake disc G on to the reel side. A reverse movement of the pin will move the block laterally outward to free the pinion and permit the brake disc to come away from its pressure on the reel. The amount of movement given the pin and the rate of movement imparted to it will thus govern the braking action on the reel.

We claim:—

1. In fishing reels, the combination with a reel mounted on a spindle, and with a driving pinion mounted on such spindle, and capable of sliding thereon, of a brake disc mounted loosely on the spindle between the reel and the pinion, and means whereby such pinion may be moved along the spindle to engage the brake disc and force it into surface contact with the side of the reel, substantially as specified.

2. In fishing reels, a reel casing, a spindle journalled in the sides of such casing, a reel fixed on such spindle, a driving pinion mounted on the spindle and capable of sliding movement thereon, a brake disc mounted loosely on the spindle between the reel and the pinion, a slot in the casing side extending concentrically with the spindle, an inclined surface extending concentrically with the spindle on the inside of such casing side, a pin passing through such slot, a block on the inner end of the pin disposed between the said pinion and the said inclined surface and a finger grip upon the outer end of the said pin, substantially as and for the purposes specified.

In testimony whereof, we affix our signatures.

PETER ROBERTSON GARDNER.
DAVID WYLLIE.